United States Patent [19]

Hayashi et al.

[11] Patent Number: 4,756,208
[45] Date of Patent: Jul. 12, 1988

[54] MID-MOUNT TRACTOR

[75] Inventors: Tetsuaki Hayashi, Osaka; Hiroyuki Ogasawara, Izumi; Nobuyuki Yamashita; Niro Bando, both of Sakai, all of Japan

[73] Assignee: Kubota, Ltd., Shikitsuhigashi, Japan

[21] Appl. No.: 552

[22] Filed: Jan. 5, 1987

[30] Foreign Application Priority Data

Jan. 8, 1986 [JP] Japan ............................ 61-780[U]
Jan. 9, 1986 [JP] Japan ............................ 61-1512[U]
Jan. 9, 1986 [JP] Japan ............................ 61-1514[U]

[51] Int. Cl.⁴ .................................................. F16H 37/08
[52] U.S. Cl. ........................................ 74/700; 74/740; 74/606 R; 180/70.1
[58] Field of Search ..................... 74/700, 740, 606 R, 74/689, 687, 681, 694; 180/70.1, 292, 900

[56] References Cited

U.S. PATENT DOCUMENTS

| | | | |
|---|---|---|---|
| 2,776,583 | 1/1957 | Williams | 74/694 X |
| 2,791,912 | 5/1957 | Bixby | 74/700 X |
| 3,477,439 | 11/1969 | Hamouz et al. | 180/70.1 |
| 3,613,815 | 10/1971 | Meylink et al. | 180/70.1 X |
| 3,759,342 | 9/1973 | Plamper | 180/70.1 |
| 4,513,834 | 4/1985 | Hayashi et al. | 180/70.1 |
| 4,579,183 | 4/1986 | Irikura et al. | 180/70.1 X |

Primary Examiner—Leslie A. Braun
Assistant Examiner—Dwight G. Diehl
Attorney, Agent, or Firm—Webb, Burden Robinson & Webb

[57] ABSTRACT

A mid-mount lawn tractor comprising an engine, front and rear wheels, and a working implement or lawn mower mounted between the front and rear wheels. A transmission is disposed adjacent the rear wheels and includes an upwardly extending input section. The transmission is housed in a transmission case defining an opening at an upper portion thereof for exposing the input section. A hydraulic stepless change speed apparatus is disposed above the transmission. The change speed apparatus includes a downwardly extending input shaft for receiving power of the engine through an endless belt, and a downwardly extending output shaft connected through the opening of the transmission case to the input section of the transmission.

16 Claims, 3 Drawing Sheets

MID-MOUNT TRACTOR

BACKGROUND OF THE INVENTION (1) Field of the Invention

The present invention relates to a mid-mount tractor comprising a working implement such as a mower or grass cutting blade, a flower finishing device, or a cleaning device mounted between front and rear wheels, and a transmission case disposed rearwardly of the working implement and supporting the rear wheels.

(2) Description of the Prior Art

Conventional tractors of the type noted above have a hydraulic stepless change speed apparatus and the transmission case arranged in the fore and aft direction of the tractor body. In the case of the known structure, where a working implement such as a mower is disposed between the front and rear wheels, the hydraulic stepless change speed apparatus must be positioned rearwardly not to project into a space for accommodating the working implement. This increases the wheelbase between the front axle and the rear axle supported by the transmission case, resulting in a large construction.

A construction devised to eliminate the above drawback is known from U.S. Pat. No. 4,513,834, for example. In this patent, the transmission case is divided into a portion for reduction and a portion for differential function, with the portion for reduction having a vertically elongated configuration. However, since in the disclosed construction the hydraulic stepless change speed apparatus and the transmission case are arranged in the fore and aft direction of the tractor body, it is not fully satisfactory with regard to the length of wheelbase. Moreover, even though the hydraulic stepless change speed apparatus has an input mechanism position high above the ground, the lower half of the change speed apparatus remains obstructive to realization of a useful space.

SUMMARY OF THE INVENTION

An object of the present invention is to provide a tractor having a short wheelbase and yet assuring a useful space between the front and rear wheels, which is realized by a simple variation of positional arrangement between the hydraulic stepless change speed apparatus and the transmission.

In order to achieve this object, a mid-mount tractor according to the invention comprises an engine, front and rear wheels, a working implement mounted between the front and rear wheels, a transmission disposed adjacent the rear wheels and including an upwardly extending input section, a transmission case housing the transmission and defining an opening at an upper portion thereof for exposing the input section, and a hydraulic stepless change speed apparatus disposed above the transmission, the hydraulic stepless change speed apparatus including a downwardly extending input means for receiving power of the engine through power transmitting means, and a downwardly extending output means connected through the opening to the input section of the transmission.

Since the hydraulic stepless change speed apparatus is positioned above the transmission case, a fore and aft length of space occupied by the transmission case and hydraulic stepless change speed apparatus may be shortened whereby the wheelbase is shortened to a great extent. Since the hydraulic stepless change speed apparatus is disposed rearwardly of the working space of the mower and not above the working space as in the prior art, there is no interference between the driving deck and the change speed apparatus and the driving deck may be flat transversely of the tractor. Furthermore, the hydraulic stepless change speed apparatus having input means attached to its bottom portion permits the power transmitting means extending from the engine to the input means to be disposed at a low position. Where, for example, the engine is mounted at a front portion of the tractor, the power transmitting means is disposed under the driving deck. Since the power transmitting means is disposed at a low position as noted above, the driving deck need not be disposed at a high level.

Other objects and advantages of the present invention will be apparent from the following description.

BRIEF DESCRIPTION OF THE DRAWINGS

The drawings illustrate a mid-mount tractor embodying the present invention, in which.

DESCRIPTION OF THE PREFERRED EMBODIMENTS

Figure 1:
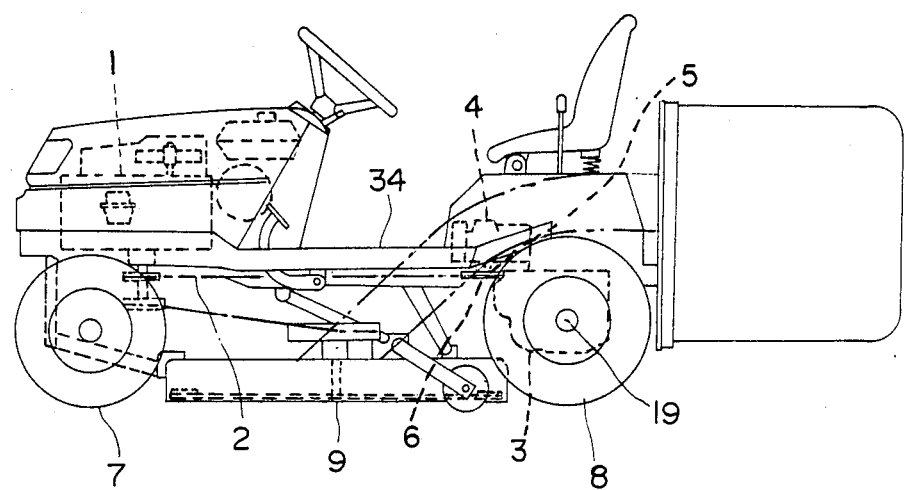
FIG. 1 is a side elevation of the tractor.

The tractor shown in FIG. 1 is a mid-mount type lawn tractor. This tractor comprises an engine 1 mounted at a front portion thereof, and a transmission case 3' supporting a rear axle 19 at a rear portion thereof. A hydraulic stepless change speed apparatus 4, which is switchable between a position for forward drive and a position for backward drive, is connected to an upper front surface of the transmission case 3'. The tractor further comprises a mower 9 between front wheels 7 and rear wheels 8. The power of engine 1 is transmitted through a belt 2, which is one example of endless, circular transmission member, extending through a space below a flat deck 34, to a downwardly extending input means of the change speed apparatus 4, the input means in this embodiment comprising an input shaft 5 including a pulley 6. The power subjected to change speed at the stepless change speed apparatus 4 and is input to a transmission 3 housed in the transmission case 3'.

Figure 2:
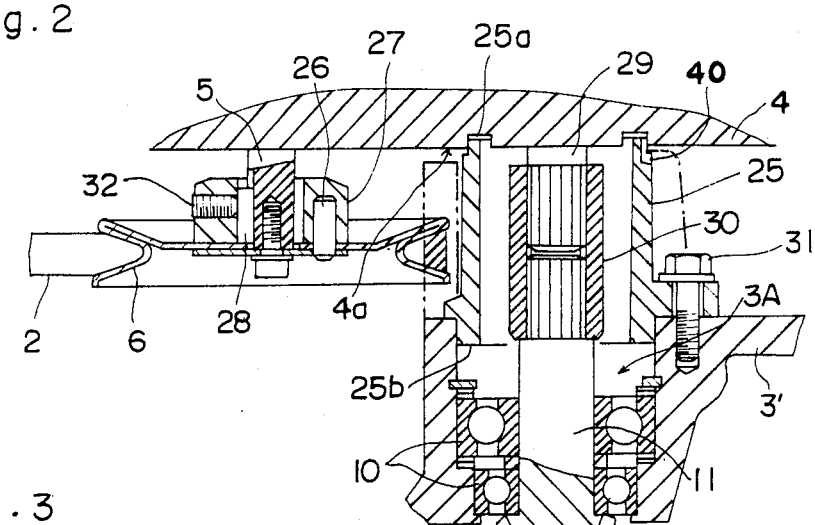
FIG. 2 is a view in vertical section of an attachment structure between a hydraulic stepless change speed apparatus and a transmission case.
Figure 4:
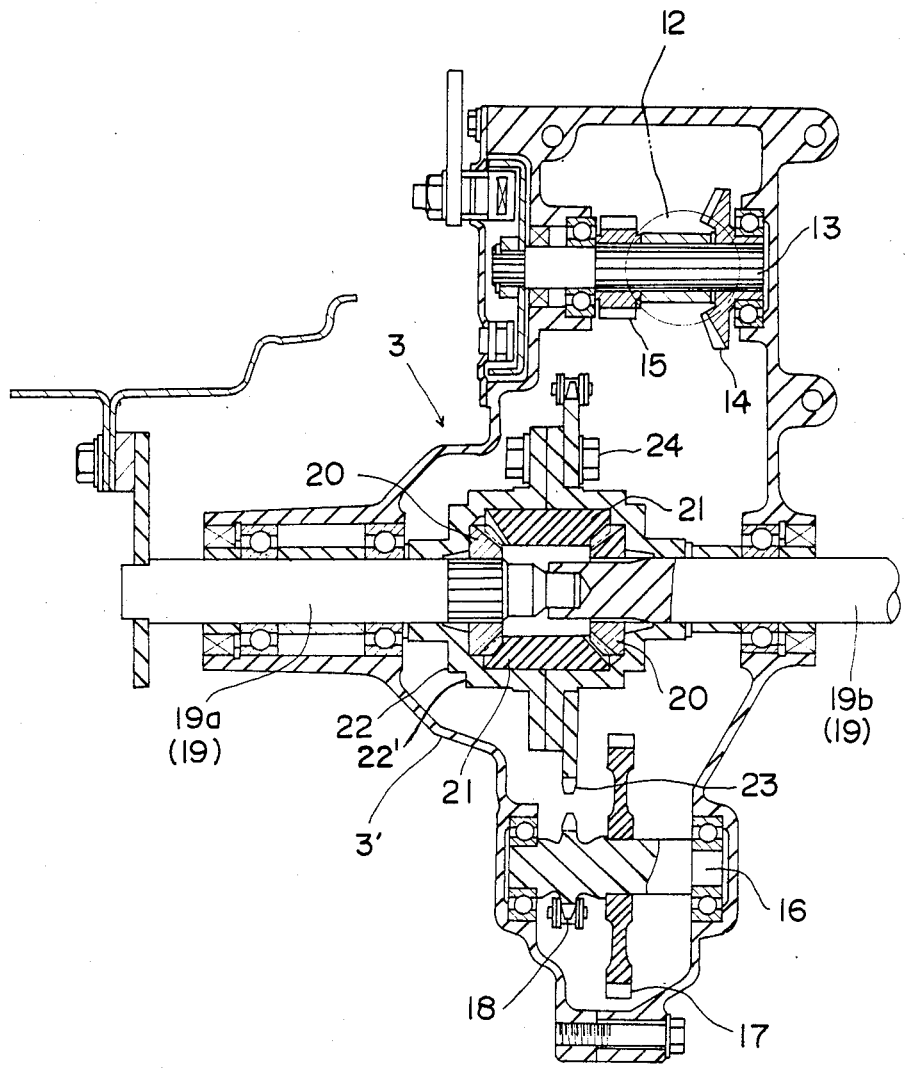
FIG. 4 is a developed sectional view taken on line IV—IV of FIG. 3 and showing an interior construction of the transmission case.

The construction of transmission 3 will be described in detail. As shown in FIGS. 2 and 4, the transmission case 3' defines an upwardly directed input opening 3A at the upper front face thereof. The opening 3A houses two, large and small bearings 10 fitted therein one above the other for supporting a vertical, transmission input shaft 11 acting as input section of the transmission 3. The transmission input shaft 11 includes a first bevel gear 12 formed integral therewith at a lower end thereof. A first transmission shaft 13 is supported below the transmission input shaft 11 to extend transversely of the tractor. The first transmission shaft 13 carries a second bevel gear 14 and a first gear 15 splined thereto, the former being in constant mesh with the first bevel gear 12. A second transmission shaft 16 is supported below the first transmission shaft 13 to extend parallel thereto. The second transmission shaft 16 carries a second gear 17 fixed thereto and in constant mesh with the first gear 15, and a first sprocket 18 formed integral with the second transmission shaft 16. The rear axle 19 is supported rearwardly and upwardly of the second transmission shaft 16.

The rear axle 19 comprises a left rear axle 19a and a right rear axle 19b. The right rear axle 19b defines a recess at one end surface thereof, and the left rear axle 19a defines at one end surface thereof a projection corresponding in dimension to the recess. The left and right rear axles abuttingly fit with each other through the recess and projection to be relatively rotatable. A differential mechanism 22 is mounted in the region of abutment between the left and right rear axles 19a and 19b. This differential mechanism 22 includes a differential case 22' comprising two case portions, differential side gears 20 mounted on the left and right rear axles 19a and 19b, and differential pinion gears 21 directly supported by inside walls of the differential case 22'. One of the case portions carries a second sprocket 23 fixed to a stepped position thereof by means of differential case retainer bolts 24 and operatively connected to the first sprocket 18 through a chain.

The positional relationship among the first transmission shaft 13, second transmission shaft 16 and rear axle 19 may not be clear from FIG. 4 since the latter is a developed sectional view of the transmission 3. As clearly seen from FIG. 3, the first transmission shaft 13, second transmission shaft 16 and rear axle 19 have respective axes P1, P2 and P3 forming an acute angle <P1 P3 P2. This arrangement contributes toward compactness of the transmission 3.

Figure 3:
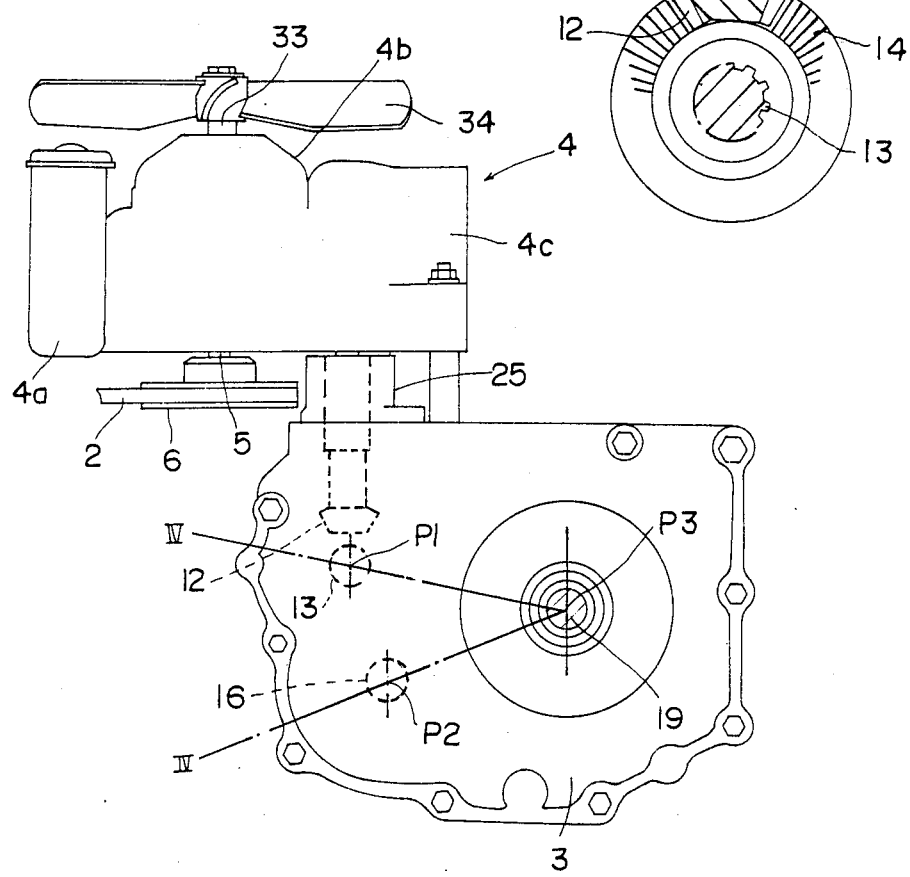
FIG. 3 is a side view showing the attachment between the hydraulic stepless change speed apparatus and transmission case.

How the stepless change speed apparatus 4 is attached to the transmission case 3' will particularly be described hereinafter. As shown in FIGS. 2 and 3, the change speed apparatus 4 includes a pressure oil tank 4a, a pump section 4b and a change speed section 4c. The pump section 4b supports the downwardly extending input shaft 5 of the stepless change speed apparatus at a bottom surface thereof, and an upwardly extending shaft 33 at a top surface thereof, the shaft 33 carrying a coolng fan 34 for directing air downwardly.

The cooling fan 34 acts to cool the hydraulic stepless change speed apparatus 4 and to blow grass clippings away from the change speed apparatus 4 and transmission case 3'. This is effective to prevent overheating of the change speed apparatus 4 and transmission case 3' thereby avoiding an early deterioration of oil and seizure, and to prevent the grass clippings from adhering to the change speed apparatus 4 and transmission case 3' thereby eliminating possibility of a fire resulting from burning or smoking of such grass clippings.

Furthermore, the input shaft 5 carries a tubular boss 27 fixed thereto by a key 28 and a retainer bolt 32, and the rotary input member or pulley 6 is fixed to the tubular boss 27 by pins 26. The change speed section 4c supports at a bottom surface thereof an output shaft 29 of the stepless change speed apparatus extending downwardly as does the input shaft 5. By means of a spline coupling 30, the output shaft 29 is connectable to and disconnectable from the transmission input shaft 11. The input opening 3A houses position setting sleeve 25 fixed to the transmission case 3' by bolts 31. The sleeve 25 has one end 25a thereof fitted to a boss 4a of the change speed section 4c supporting the output shaft 29, and the other end 25b fitted in an inside wall 3a of the input opening 3A. This construction serves to connect the stepless change speed apparatus 4 to the transmission case 3'.

There is the problem of interference between the position setting sleeve 25 and the pulley 6 mounted on the input shaft 5 of the hydraulic stepless change speed apparatus, which arises from the two points, i.e. that the input shaft 5 and output shaft 29 of the stepless change speed apparatus extend parallel and downwardly, and that the hydraulic stepless change speed apparatus 4 and the transmission case 3' are interconnected by the position setting sleeve 25 to render the output shaft 29 and the input shaft 11 of the transmission 3 to be connectable to and disconnectable from each other. However, as shown in FIG. 2, the position setting sleeve 25 has the other end 25b fitted in and supported by the inside wall of the input opening 3A of the transmission case. Compared with the case of the transmission case defining an integral boss, as shown in phantom lines, having an inside diameter capable of receiving bearings 10, the present construction permits the sleeve 25 to have a small outside diameter and consequently permits the pulley 6 to have a large diameter. The sleeve 25 may of course be formed integral with the transmission case 3' provided there is an allowance of space therefor.

The pulley 6 having a large diameter permits the belt 2 to be wound therearound over a long lenth to secure a sufficient torque transmission. The belt 2 may be saved from damage or the like since no undue force will act thereon. The same advantage may be realized where the belt 2 is replaced, for example, with a chain to act as means for operatively connecting the stepless change speed apparatus 4 to the engine 1.

Figure 5:
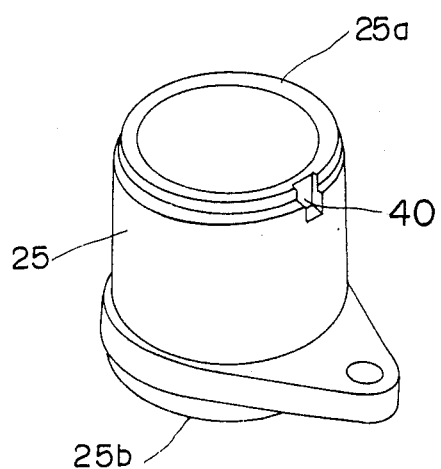
FIG. 5 is a perspective view of a sleeve.

Referring to FIGS. 2 and 5, according to a further preferred embodiment of the present invention, the position setting sleeve 25 defines a cutout 40 at one peripheral position of its upper fitting end portion. This cutout 40 serves as vent for communicating the interior of the transmission case 3' with the ambient. A plurality of such cutouts may be provided instead of one.

Air flowing through the cutout or cutouts 40 constitutes upward currents which are effective to prevent entry of dust or the like. Consequently, by effectively utilizing the sleeve 25, the transmission case 3' disposed below the stepless change speed apparatus 4 does not require a venting structure to be specially provided. It is not necessary to reinforce the transmission case 3' according to the present embodiment, which would be necessary if the transmission case per se defined such a venting structure. The venting structure defined by the sleeve 25 may be devised to have a good sealing performance.

What is claimed is:

1. A mid-mount tractor comprising an engine (1),
front and rear wheels (7, 8),
a working implement (9) mounted between the front and rear wheels,
a transmission (3) disposed adjacent the rear wheels (8) and including an upwardly extending input means,
a transmission case (3') housing the transmission (3) and defining an opening (3A) at an upper portion thereof for exposing the input means, and
a hydraulic stepless change speed apparatus (4) disposed above the transmission (3), said hydraulic stepless change speed apparatus (4) including a downwardly extending input shaft for receiving power of the engine (1) through power transmitting means (2), and a downwardly extending output shaft connected through the opening (3A) to the input means of the transmission (3).

2. A tractor as claimed in claim 1 wherein the hydraulic stepless change speed apparatus (4) is connected to the transmission case (3') through a position setting sleeve (25) having one end (25a) thereof engaged with the hydraulic stepless change speed apparatus (4) and the other end (25b) thereof fitted in and supporting by inside walls of the opening (3A).

3. A tractor as claimed in claim 2 wherein at least one vent (33) is defined in a region of engagement between the position setting sleeve (25) and the hydraulic stepless change speed apparatus (4) for communicating an interior of the transmission case (3') with the ambient.

4. A tractor as claimed in claim 2 wherein the input means comprises a transmission input shaft (11) supported by the transmission case (3') through bearings (10), the transmission input shaft (11) having one end thereof connected to the output shafts of the hydraulic stepless change speed apparatus (4) through a coupling (30) and the other end thereof carrying a first bevel gear (12).

5. A tractor as claimed in claim 4 wherein the transmission (3) includes a reduction mechanism a differential mechanism that receive power from the input means, the rear wheels being attached to rear axles (19) acting as output shafts of the differential mechanism.

6. A tractor as claimed in claim 5 wherein the reduction mechanism includes a first transmission shaft (13), a second transmission shaft (16), and a plurality of gear trains mounted on the first and second transmission shafts, the first and second transmission shafts being disposed one above the other.

7. A tractor as claimed in claim 6 wherein a first imaginary line passing through the center of said rear axle and through the center of said first transmission shaft intersects a second imaginary line passing through the center of said rear axle and through the center of said second transmission shaft at an acute angle at the center of said rear axle.

8. A tractor as claimed in claim 7 wherein at least one vent (40) is defined in a region of engagement between the sleeve portion and the hydraulic stepless change speed apparatus (4) for communicating an interior of the transmission case (3') with the ambient.

9. A tractor as claimed in claim 1 wherein the hydraulic stepless change speed apparatus (4) includes a rotary shaft (34) projecting upwardly from an upper surface thereof and carrying a cooling fan (35) for directing air downwardly.

10. A tractor as claimed in claim 1 wherein the transmission case (3') defines a sleeve portion projecting from peripheries of the opening (3a), the transmission case (3') being connected to the hydraulic stepless change speed apparatus (4) by placing an upper end of the sleeve portion in engagement with the hydraulic stepless change speed apparatus (4).

11. A tractor as claimed in claim 10 wherein at least one vent (40) is defined in a region of engagement between the sleeve portion and the hydraulic stepless change speed apparatus (4) for communicating an interior of the transmission case (3') with the ambient.

12. A tractor as claimed in claim 1 wherein said transmission includes a transmission shaft means consisting of an input shaft extending vertically, a plurality of change speed transmission shafts, and a rear axle (19), the transmission shaft and rear axle extending transversely of the vehicle body.

13. A tractor as claimed in claim 12 wherein the plurality of change speed transmission shafts consist of a first transmission shaft (13) and a second transmission shaft (16), and the rear axle (19) is provided with a differential mechanism.

14. A tractor as claimed in claim 13 wherein a first imaginary line passing through the center of said rear axle and through the center of said first transmission shaft intersects a second imaginary line passing through the center of said rear axle and through the center of said second transmission shaft at an acute angle at the center of the rear axle.

15. A tractor as claimed in claim 1 wherein said input shaft of the hydraulic stepless change speed apparatus further includes a pulley attached to said downwardly extending input shaft and adapted to receive engine power through a belt.

16. A mid-mount tractor comprising an engine (1), front and rear wheels (7, 8), a working implement (9) mounted between the front and rear wheels (7, 8), a transmission (3) disposed adjacent the rear wheels (8) and including an upwardly extending input means, a transmission case (3') housing the transmission (3) and defining an opening (3A) at an upper portion thereof for exposing the input means, with said transmission case (3) defining a sleeve portion projecting from peripheries of the opening (3A), and a hydraulic stepless change speed apparatus (4) disposed above the transmission (3), said hydraulic stepless change speed apparatus (4) including a downwardly extending output means for receiving power of the engine (1) through power transmitting means (2) and a downwardly extending input means connected through the opening (3A) to the input means of the transmission, with said transmission case (3') connected to the hydraulic stepless change speed apparatus (4) by placing an upper end of said sleeve portion in engagement with the hydraulic stepless change speed apparatus (4).

* * * * *

UNITED STATES PATENT AND TRADEMARK OFFICE
CERTIFICATE OF CORRECTION

PATENT NO. : 4,756,208

DATED : July 12, 1988

INVENTOR(S) : Tetsuaki Hayashi, Hiroyuki Ogasawara, Nobuyuki Yamashita and Niro Bando It is certified that error appears in the above-identified patent and that said Letters Patent is hereby corrected as shown below:

Column 4 Line 27 "lenth" should read --length--.

Claim 4 Column 5 Line 20 "shafts" should read --shaft--.

Claim 16 Column 6 Line 47 "input" should read --output--.

Signed and Sealed this

Twenty-eighth Day of February, 1989

Attest:

DONALD J. QUIGG

*Attesting Officer*      *Commissioner of Patents and Trademarks*